Figure 1:
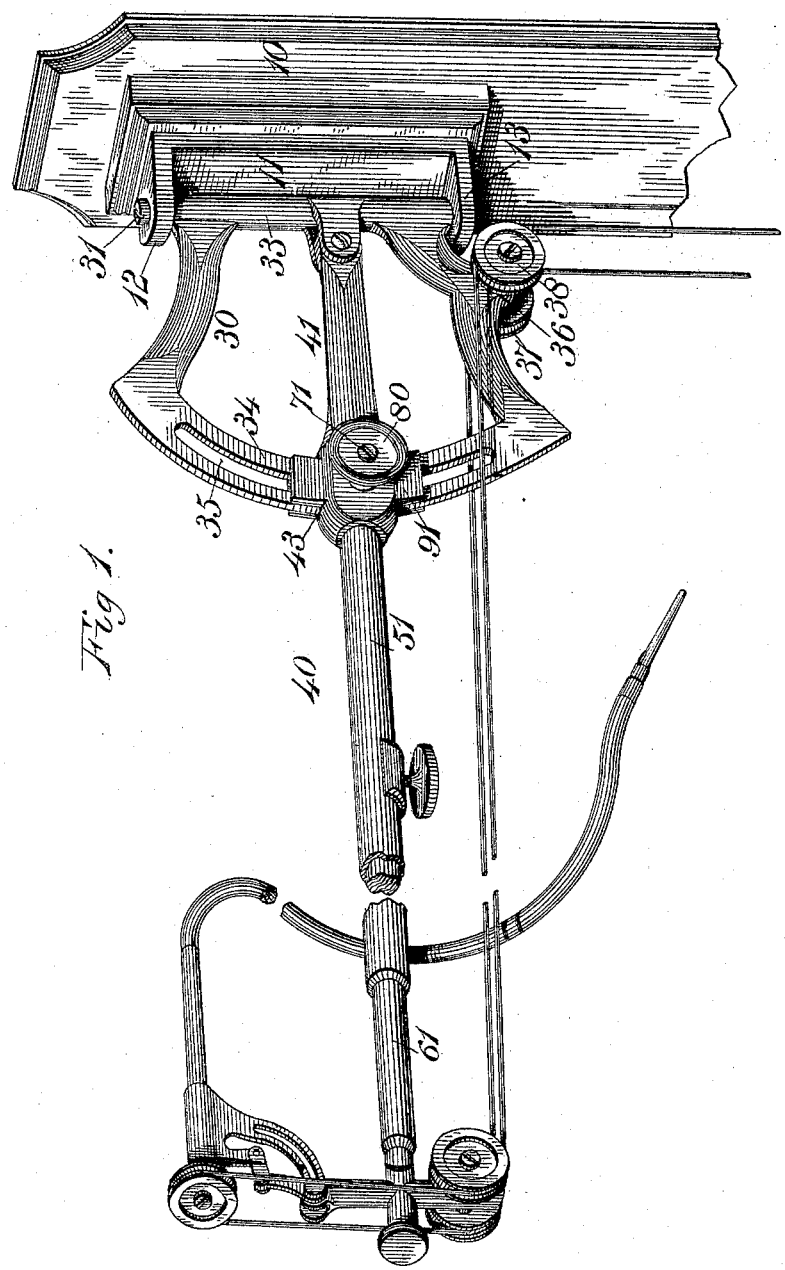

(No Model.) 2 Sheets—Sheet 1.

C. E. RHONE.
DENTAL ENGINE.

No. 492,433. Patented Feb. 28, 1893.

WITNESSES
Harry King.
Ian. G. Cameron.

INVENTOR
Charles E. Rhone
F. C. Somes, Attorney (No Model.) 2 Sheets—Sheet 2.
C. E. RHONE.
DENTAL ENGINE.
No. 492,433. Patented Feb. 28, 1893.
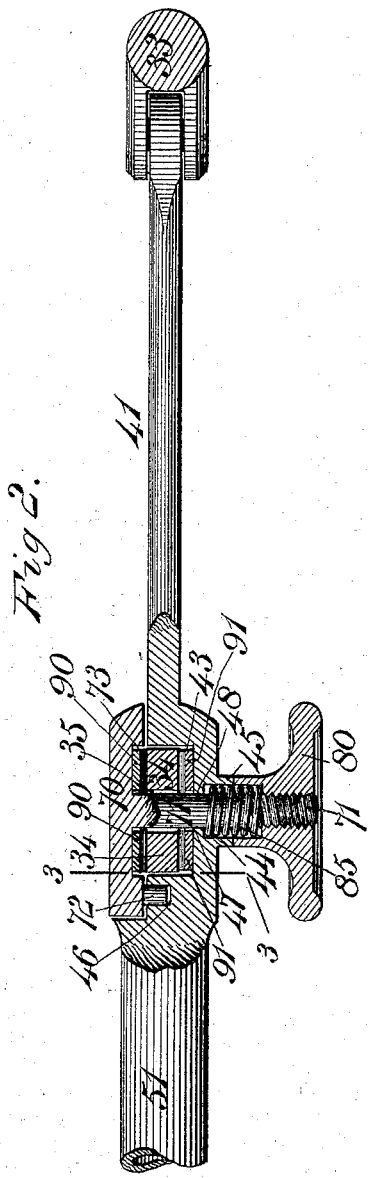
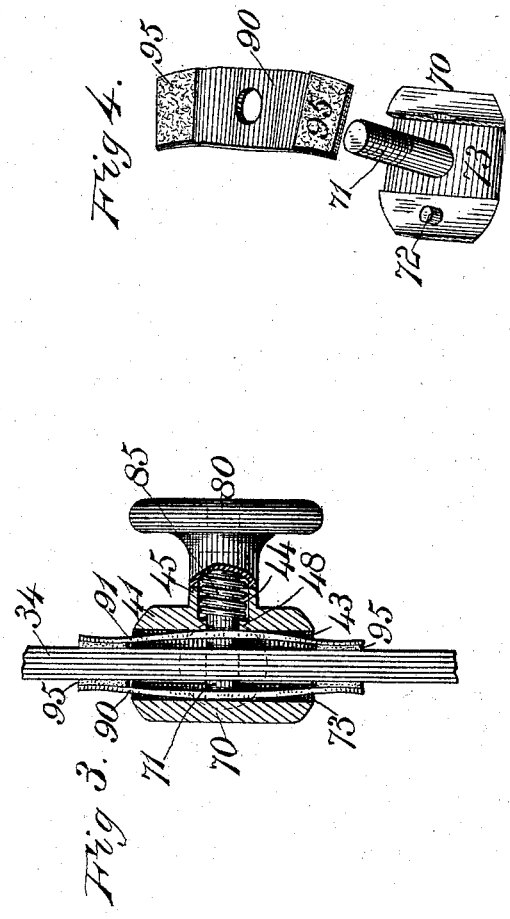
WITNESSES
Harry King
Jan. G. Cameron
INVENTOR
Charles E. Rhone
By J. C. Somes
Attorney

UNITED STATES PATENT OFFICE.

CHARLES E. RHONE, OF BELLEFONTE, PENNSYLVANIA.

DENTAL ENGINE.

SPECIFICATION forming part of Letters Patent No. 492,433, dated February 28, 1893.

Application filed October 15, 1892. Serial No. 449,017. (No model.)

*To all whom it may concern:*

Be it known that I, CHARLES E. RHONE, a citizen of the United States of America, residing at Bellefonte, in the county of Centre, in the State of Pennsylvania, have invented a new and useful Improvement in Dental Engines, of which the following is a specification.

This invention relates to dental engines which when in use are usually attached to the wall and operated by a motor, and in which the engine arm is capable of universal adjustment in any direction and free to be moved at the will of the operator and adapted to maintain itself in its adjusted position without the manipulation of a set screw or other locking device on the part of the operator.

The object of this invention is to secure in an adjustable dental engine arm the combined properties in a high degree of stability of position, elasticity of adjustment, and durability of the connection.

Figure 1 of the accompanying drawings represents a perspective view of this improved dental engine arm omitting the motor and the tension device for the driving cord. Fig. 2 is a horizontal section of the supporting bracket, a portion of the engine arm pivoted thereto, and the automatic clamping device for holding said arm in adjusted position on said bracket. Fig. 3 represents a transverse section on line 3—3 of Fig. 2. Fig. 4 represents perspective views of the clamping plate and one of the bow springs constituting parts of the clamp for connecting the engine arm and bracket.

The same reference numbers indicate the same parts in the different figures.

The wall plate 10 is designed to be attached to the wall in any desired position adjacent to the dental chair or it may constitute an upright standard attached to the floor adjacent to said chair. A fixed plate 11 provided with ears 12 and 13 near its ends is attached to said wall plate. A swiveled bracket 30 is hinged between the ears 12 and 13 by means of pivots, as 31, which may be in the form of screws passing through said ears and entering sockets in the vertical rear arm 33 of said bracket. The front arm 34 of said bracket is preferably arc-shaped and provided with a slot 35 preferably arc-shaped. A lug 36 preferably depends from the lower bar of said bracket carrying pulleys 37 and 38 journaled on studs on said lug.

An engine arm 40 is pivoted to the rear arm 33 of the swiveled bracket 30. This engine arm is preferably constructed in three sections, a rear section 41, pivoted as aforesaid, an outer tubular section 51 attached to or formed integral with the outer end of the section 41, and an inner tubular section 61 sliding within the outer section 51. The rear section 41 is provided on its outer end on its outer face with an angular transverse recess 43 and on its inner face with a circular recess 44 surrounded by a rim or flange 45. A stud hole 46 is disposed near the recess 43. A larger stud hole 47 connects the two recesses 43 and 44, forming a shoulder 48 at the base of the circular recess.

A clamping plate 70 provided with a central stud 71 and with a smaller stud 72, is disposed on one face of the engine arm opposite the recess 43 therein. The small locking stud 72 enters the stud hole 46 of said arm and locks the plate in position thereon, while the larger stud 71 extends through the central stud hole and projects on the opposite face of said arm, said larger stud being screw-threaded at its outer end. This clamping plate is provided with a recess 73 on its inner face opposite the recess 43 of the engine arm. A thumb nut 80 having a circular recess on its inner face corresponding with the circular recess of the engine arm, is adapted to engage the screw-threaded end of the central stud 71. A spiral spring 85 is disposed around said stud in said circular recesses, bearing at its inner end against the shoulder 48 of the engine arm and its outer end against said nut.

The arm 34 of the bracket 30 extends through the transverse recess in the engine arm and two bow springs 90 and 91 are disposed on opposite sides of said bracket arm, said springs being provided with holes through which the stud 71 passes, one of said springs bearing at its center against the inner face of the transverse recess and the other spring bearing at its center within the recess on the inner face of the clamping plate. The outer ends of these springs are provided with frictional contact faces 95 and bear against the curved arm 34 of the bracket 30. These springs serve to impart sufficient friction to overcome the weight of the engine arm. When the latter is swung in the desired position, it will remain there without a locking device; yet owing to the springs on opposite sides it has an elastic adjustment and is sufficiently free to be moved under pressure of the hand of the operator into the desired position. The tension of the springs referred to is regulated when required by the thumb nut 80, and by the auxiliary tension spring 85 around the stud 71.

In assembling the parts, after the engine arm 41 is pivoted to the arm 33 of the bracket 30, and the slotted arm 34 of this bracket rests in the transverse recess 43 of said arm, the bow-spring 91 is placed between said slotted arm 34 and the inner face of said recess, its hole being adjusted opposite the hole 47 in said arm. The other bow-spring 90 is then placed on the stud 71 of the clamping plate 70 and disposed in the recess of said plate. The stud 71 of said clamping plate is then passed through the slot of the arm 34, through the hole in the spring 91 and through the hole 47 in the arm 41. The spiral spring 85 is then passed over said stud 71 down into the circular recess 44 of the arm 41. The thumb nut 80 is then screwed onto the stud 71 and the annular recess at the inner end thereof closes down over the outer end of the spring 85.

In the use of a dental engine provided with this improved connection for the pivoted engine arm, when the latter arm is adjusted, it will yield readily to the pressure of the hand of the operator for that purpose and yet the tension of the springs is such as to hold it firmly in the adjusted position. The tension of the springs may be changed by simply adjusting the thumb-screw.

I claim as my invention—

1. The combination of two members one of which is movable on the other, and a connecting device therefor consisting of a clamping plate provided with a stud, a spring disposed between said clamping plate and one of said members, a spring disposed between one of said members and the other, and a thumb-nut on said stud for adjusting the tension of said spring.

2. The combination of a bracket having a slotted arm, a pivoted engine arm movable on said slotted arm, a clamping plate provided with a stud passing through said slotted arm, a spring between said engine arm and said slotted arm, a spring between said clamping plate and said slotted arm, a thumb-nut on said stud, and a spring between the thumb-nut and the engine arm, substantially as set forth.

3. The combination of a bracket having a slotted arm, a pivoted engine arm movable on said slotted arm and provided with a transverse recess through which said slotted arm passes, a clamping plate provided with a recess on its inner face and with a stud which passes through said slotted arm, bow-springs disposed in said recesses and bearing on opposite sides of said slotted arm, and a fastening device on said stud, substantially as set forth.

4. The combination of a bracket having a slotted arm, a pivoted arm movable on said slotted arm and provided with a transverse recess and with a stud hole on one side of said recess, a clamping plate provided with a central stud passing through said arm, and with a locking stud entering said stud-hole, springs on opposite sides of said arm, engaged by said clamping plate and by said arm, and a nut on said central stud.

5. The combination of a slotted member, a pivoted member movable thereon, and provided with a transverse recess in one face and with a circular recess on the opposite face, a clamping plate provided with a stud passing through said arm and recesses, springs in said recesses and bearing against said slotted arm, a nut on said stud provided with a circular recess at its inner end, and a spiral spring disposed around said stud in said circular recesses.

CHARLES E. RHONE.

Witnesses:
D. L. KELLER,
J. W. RHONE.